UNITED STATES PATENT OFFICE.

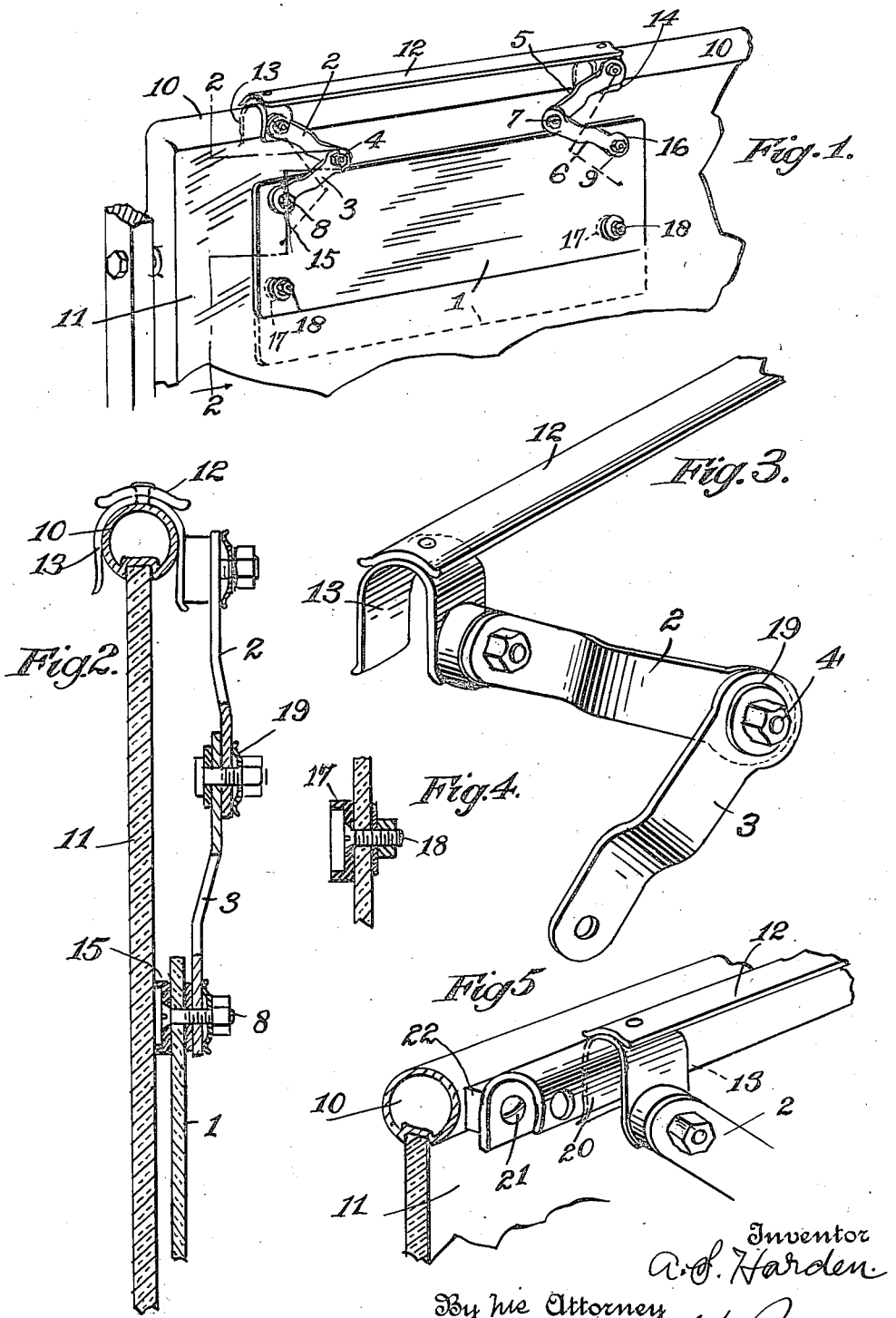

ALBERT S. HARDEN, OF NEWARK, NEW JERSEY.

WINDSHIELD ATTACHMENT.

1,421,467.　　　Specification of Letters Patent.　　Patented July 4, 1922.

Application filed September 28, 1921. Serial No. 503,853.

*To all whom it may concern:*

Be it known that I, ALBERT S. HARDEN, a citizen of the United States, and a resident of Newark, in the county of Essex and State of New Jersey, have invented certain new and useful Improvements in Windshield Attachments, of which the following is a specification.

This invention has reference to attachments to windshields whereby the glare from the sun's rays in the daytime, and from the lights of other motor cars at night, can be obscured or practically obstructed.

The object of the invention is to provide an attachment of this nature that can be readily secured to the conventional form of wind-shield by merely slipping it on to the upper bar thereof, or on to a special bar readily attached to the wind-shield in closed cars, where the upper bar is connected with the top; and which device can be adjusted in its attachment along the wind-shield to desired positions, and which is therefore adjustable when attached, both vertically and laterally.

In the accompanying drawing showing one embodiment of my invention, Figure 1 is a perspective view showing the device in position.

Fig. 2 is a vertical section enlarged, as indicated by line 2—2 of Fig. 1.

Fig. 3 is a perspective view at one end of the support.

Fig. 4 is a section through one joint.

Fig. 5 shows a detail of the attaching bar for closed cars.

As shown in the drawing I provide a plate of suitable material such as plate glass 1 that is preferably colored rather darkly, blue being the best color for this purpose as most absorbent. I provide a pair of links at each end of the glass plate, as shown links 2 and 3 are pivoted together by a bolt 4 to form a toggle joint, and another pair of similar links 5 and 6 are secured together by a bolt 7. The links 3 and 6 have their ends bolted to the upper corners of the plate 1, by bolts 8 and 9.

These links are provided with means for readily attaching to the upper bar 10 of a wind-shield 11, whereby they can be sprung on to this bar and also slid along the bar to any desired position. The supporting means shown comprise a metal bar 12 having spring clips 13, 14 at the ends secured to this bar, and the links 2 and 5 are pivoted to the clips 13 and 14, see Fig. 1, by suitable bolts to provide a friction joint. These clips 13 and 14 are substantially U shape to frictionally engage the top bar 10 of the wind-shield being simply pressed down on top thereof as shown in Figs. 1 and 2.

Where the links 3 and 6 are pivoted to the plate 2 I preferably provide rubber washers 15 and 16 on the securing bolt 17. The inner washer 16 is in the form of a suction cup and also acts as a buffer between the glass plate 1 and the wind-shield plate 11. A similar suction washer 18 is placed at the lower ends of the plate 2 for engagement with the wind-shield plate 11 and will act as a buffer and at the same time tend to retain the plate 1 in desired positions.

At the middle joint of the two links, that constitute practically a toggle joint, I preferably provide at one or both sides of the links, spring washers 19, as shown in Fig. 2, that will cause a certain amount of friction to retain the toggle links in the various positions to which adjusted.

In some motor cars, the upper bar 10 of the wind-shield is connected with the top of the car that would prevent the attachment of the supporting bar with the spring clips 13 and 14. In such cases I provide a special bar of a form that will receive the spring clips and which can be secured to the top bar of the wind-shield. In Fig. 5 I show a channel-shape bar 20, corresponding in shape to the top bar 10 of the wind-shield, and which is secured at 21 to the wind-shield bar 10, preferably being slightly offset by a washer 22. It will be understood that a device of this kind is comparatively simple, comprising merely the two toggle links pivoted to the glass plate, with the supporting bar and the two spring clips. The device can be placed in position without the use of tools by merely springing the clips down on the wind-shield top bar. The device can be shifted along the wind-shield between either end thereof to any position and furthermore can be adjusted vertically by the toggle links, that will also provide a certain amount of lateral adjustment, but will retain the obscuring plate in any position to which shifted, as assisted by the suction cups at the corners of the glass plate.

What I claim is:

1. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, and resilient means on the bar ends to slip on the windshield top bar for adjustment along the bar.

2. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, and means on the plate for retaining it in engagement with the wind-shield in any position of adjustment.

3. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, and suction means on the corners of the plate for retaining it in engagement with the wind-shield in any position of adjustment.

4. An attachment for a wind-shield, comprising an elongated plate of transparent material, and a pair of supporting members, each comprising a pair of links pivoted together at one end, one link of each pair being pivoted to the plate adjacent one corner and the other link being pivoted to a spring clip, and a bar secured to the clips.

5. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, resilient friction means in the joints of the links.

6. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, resilient means on the bar ends to slip on the windshield top bar for adjustment along the bar, and a bar adapted to engage the spring clips and arranged to be secured to the inside face of the wind-shield top bar.

7. An attachment for a wind-shield, comprising a supporting bar, an elongated plate of transparent material, a pair of supporting members, each comprising a pair of links pivoted together at one end, one link of each pair being pivoted to the plate adjacent one corner and the other link being pivoted to the supporting bar, and clamping means on each end of the supporting bar arranged to clamp the attachment to the wind-shield top bar.

Signed at New York city, N. Y., on September 22, 1921.

ALBERT S. HARDEN.